United States Patent
Jang et al.

(10) Patent No.: US 9,979,984 B2
(45) Date of Patent: May 22, 2018

(54) SYSTEM ON CHIP, DISPLAY SYSTEM INCLUDING THE SAME, AND METHOD OF OPERATING THE DISPLAY SYSTEM

(71) Applicant: SAMSUNG ELECTRONICS CO., LTD., Suwon-si, Gyeonggi-Do (KR)

(72) Inventors: Hyuk Jae Jang, Suwon-si (KR); Sung Jei Kim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 202 days.

(21) Appl. No.: 15/148,286

(22) Filed: May 6, 2016

(65) Prior Publication Data

US 2016/0330470 A1    Nov. 10, 2016

(30) Foreign Application Priority Data

May 7, 2015 (KR) .................. 10-2015-0064058

(51) Int. Cl.
| | |
|---|---|
| H04N 7/12 | (2006.01) |
| H04N 11/02 | (2006.01) |
| H04N 11/04 | (2006.01) |
| H04N 19/70 | (2014.01) |
| H04N 19/176 | (2014.01) |
| H04N 19/109 | (2014.01) |
| H04N 19/136 | (2014.01) |

(Continued)

(52) U.S. Cl.
CPC .......... *H04N 19/70* (2014.11); *G06F 3/1415* (2013.01); *G09G 5/00* (2013.01); *G09G 5/006* (2013.01); *H04N 19/109* (2014.11); *H04N 19/136* (2014.11); *H04N 19/176* (2014.11); *G09G 2320/106* (2013.01); *G09G 2330/021* (2013.01); *G09G 2350/00* (2013.01); *G09G 2360/18* (2013.01)

(58) Field of Classification Search
CPC .... H04N 19/70; H04N 19/136; H04N 19/109; H04N 19/176; G06F 3/1415; G09G 5/006; G09G 5/00; G09G 2320/106; G09G 2330/021; G09G 2350/00; G09G 2360/18
USPC ........................................ 375/240.01–240.29
See application file for complete search history.

(56) References Cited

U.S. PATENT DOCUMENTS

| | | |
|---|---|---|
| 7,630,020 B2 | 12/2009 | Fukuda |
| 8,045,828 B2 | 10/2011 | Goto et al. |

(Continued)

FOREIGN PATENT DOCUMENTS

| | | |
|---|---|---|
| JP | 2005-275036 | 10/2005 |
| JP | 2007-248535 | 9/2007 |

(Continued)

*Primary Examiner* — Jared Walker
(74) *Attorney, Agent, or Firm* — F. Chau & Associates, LLC (57) ABSTRACT

A system on chip includes a video codec configured to output syntax information and data information, which correspond to each of a plurality of blocks included in each frame of image data, based upon a result of encoding or decoding the image data. A map generator is configured to determine whether each of the blocks is an update block based upon the syntax information and to generate a mapping table based upon a determination result. A display controller is configured to output the mapping table and data information corresponding to the update block to a display device.

11 Claims, 10 Drawing Sheets

(51) Int. Cl.
    *G09G 5/00*     (2006.01)
    *G06F 3/14*     (2006.01)

(56) References Cited

U.S. PATENT DOCUMENTS

| | | | |
|---|---|---|---|
| 2003/0067981 A1* | 4/2003 | Zhao | H03M 7/30 375/240.08 |
| 2010/0061444 A1* | 3/2010 | Wilkins | H04N 19/00006 375/240.02 |
| 2012/0002715 A1* | 1/2012 | Matsui | G06F 3/1431 375/240.01 |
| 2013/0016789 A1* | 1/2013 | Lou | H04N 19/176 375/240.18 |
| 2013/0022115 A1* | 1/2013 | Oh | H04N 19/122 375/240.12 |
| 2013/0114730 A1* | 5/2013 | Joshi | H04N 7/30 375/240.18 |
| 2014/0063030 A1 | 3/2014 | Metcalfe | |
| 2014/0105498 A1* | 4/2014 | Sethuraman | G06T 7/20 382/180 |
| 2014/0184611 A1 | 7/2014 | Wyatt et al. | |
| 2014/0218378 A1 | 8/2014 | Roh et al. | |
| 2014/0219356 A1* | 8/2014 | Nishitani | H04N 19/105 375/240.16 |

FOREIGN PATENT DOCUMENTS

| | | |
|---|---|---|
| JP | 2010-086295 | 3/2010 |
| KR | 1020050052713 | 6/2005 |

\* cited by examiner

| | | | | | | |
|---|---|---|---|---|---|---|
| 128 | 64 | 127 | 65 | 126 | | 126 |
| 78 | 90 | 250 | 234 | 210 | ••• | 210 |
| 76 | 78 | 120 | 123 | 125 | | 125 |
| 77 | 79 | 122 | 123 | 125 | | 128 |
| 76 | 78 | 120 | 123 | 125 | | 23 |
| | | | | | ⋮ | |
| 76 | 78 | 120 | 123 | 125 | ••• | 12 |

| B1 | B2 | B3 |
|----|----|----|
| B4 | B5 | B6 |
| B7 | B8 | B9 |

=

| MV=(0,0) CBP=0 | MV=(2,1) CBP=0 | MV=(2,2) CBP=0 |
|---|---|---|
| PMV=0 | MV=(2,1) CBP=0 | MV=(2,2) CBP=0 |
| PMV=0 | MV=(0,0) CBP=0 | MV=(0,0) CBP=1 |

(a) Syntax information

⇧

| 0 | 1 | 1 |
|---|---|---|
| 0 | 1 | 1 |
| 0 | 0 | 1 |

(b) Mapping table

SYSTEM ON CHIP, DISPLAY SYSTEM INCLUDING THE SAME, AND METHOD OF OPERATING THE DISPLAY SYSTEM

CROSS-REFERENCE TO RELATED APPLICATION

The present application claims under 35 U.S.C. § 119(a) priority to and the benefit of Korean Patent Application No. 10-2015-0064058 filed on May 7, 2015, the entire contents of which is incorporated by reference herein.

BACKGROUND

1. Technical Field

Exemplary embodiments of the inventive concept relate to a system on chip (SoC), a display system including the same, and a method of operating the display system, and more particularly, to a SoC for reducing bandwidth and power consumption, a display system including the same, and a method of operating the display system.

2. Description of the Related Art

With the increase of resolution of a display in mobile devices such as smart phones and tablet personal computers (PCs), the bandwidth of image data between an application processor and a display driver integrated circuit (IC) has increased. Accordingly, power consumption of a mobile application processor and/or a display driver IC is also increased.

In particular, since a mobile device reads entire frame data even when updating only a part of an entire frame of an image, a waste of bandwidth and power occurs. Therefore, an approach for reducing the waste of bandwidth and power is desired.

SUMMARY

Exemplary embodiments of the inventive concept provide a system on chip (SoC) for reducing bandwidth and power consumption, a display system including the same, and a method of operating the display system.

According to exemplary embodiments of the inventive concept, there is provided a system on chip including a video codec configured to output syntax information and data information, which correspond to each of a plurality of blocks included in each frame of image data, based upon a result of encoding or decoding the image data; a map generator configured to determine whether each of the blocks is an update block based upon the syntax information and to generate a mapping table based upon a determination result; and a display controller configured to output the mapping table and data information corresponding to the update block to a display device.

The syntax information may include predictive mode information corresponding to each of the blocks and a motion vector and a coded block pattern, which correspond to a predictive mode corresponding to the predictive mode information.

The data information may refer to a pixel value of each of the blocks based upon the encoding or decoding result and the data information corresponding to the update block may refer to a changed pixel value of a block to be updated among the plurality of blocks.

The map generator may set a bit flag corresponding to each of the blocks based upon the determination result and may generate the mapping table. The bit flag may indicate whether a current block is an update block or a non-update block.

The display controller may output the data information corresponding to the update block to the display device and may block data information corresponding to the non-update block from being output to the display device.

When a first block among the plurality of blocks corresponds to a skip mode, the map generator may set the bit flag corresponding to the first block to a first bit value when a predictive motion vector of the first block is not 0 and may set the bit flag to a second bit value when the predictive motion vector is 0.

When a second block among the plurality of blocks corresponds to a non-skip mode, the map generator may set the bit flag corresponding to the second block to the first bit value when either the motion vector or the coded block pattern of the second block is not 0.

When a third block among the plurality of blocks corresponds to the non-skip mode, the map generator may set the bit flag corresponding to the third block to the second bit value when both of the motion vector and the coded block pattern of the third block are 0.

Each block having the first bit value as the bit flag may be the update block.

The plurality of blocks may correspond to an entire area of each frame or a partial area of each frame.

According to other exemplary embodiments of the inventive concept, there is provided a display system including a system on chip configured to determine whether each of a plurality of blocks included in each frame of image data is an update block based upon syntax information corresponding to each of the blocks, to generate a mapping table based upon a determination result, and to output data information corresponding to the update block based upon the mapping table; an external memory configured to receive the data information corresponding to the update block, to update and store a block corresponding to the received data information among data information that has been stored for each of the blocks, and to output data information of an updated frame; and a display device configured to display the updated frame based upon the data information output from the external memory.

The system on chip may include a video codec configured to output the syntax information and data information, which correspond to each of the blocks, based upon the result of encoding or decoding the image data; and a map generator configured to set a bit flag corresponding to each block according to a result of determining whether the block is an update block based upon the syntax information to generate the mapping table and to output the mapping table.

The syntax information may include predictive mode information corresponding to each of the blocks and a motion vector and a coded block pattern, which correspond to a predictive mode corresponding to the predictive mode information.

The system on chip may further include a central processing unit (CPU) configured to control overall operation of the system on chip. The CPU may detect block information corresponding to the update block among the plurality of blocks based upon the mapping table and output the block information and the data information corresponding to the update block.

Alternatively, the system on chip may further include a graphics processing unit (GPU) configured to convert data read from the external memory into a signal suitable to the display device. The GPU may detect block information corresponding to the update block among the plurality of blocks based upon the mapping table and output the block information and the data information corresponding to the update block.

According to further exemplary embodiments of the inventive concept, there is provided a method of operating a display system. The method includes generating syntax information and data information, which correspond to each of a plurality of blocks included in each frame of image data, based upon a result of encoding or decoding the image data; determining whether each of the blocks is an update block based upon the syntax information; generating a mapping table based upon a determination result; outputting the mapping table and data information corresponding to the update block to a display device; and updating data information of a block corresponding to the update block among the plurality of blocks based upon the mapping table.

The generating the mapping table may include setting a bit flag corresponding to each of the blocks based upon the result of determining whether each block is the update block.

The updating the data information may include detecting block information corresponding to the update block among the plurality of blocks based upon the mapping table, outputting the block information and the data information corresponding to the update block, and updating data information corresponding to the update block among data information that has been stored in advance for the blocks based upon the block information and outputting an updated frame.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION

The inventive concept now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, and the like, may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As is traditional in the field of the inventive concepts, exemplary embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the exemplary embodiments may be physically separated into two or more interacting and discrete blocks without departing from the scope of the inventive concepts. Likewise, the blocks of the exemplary embodiments may be physically combined into more complex blocks without departing from the scope of the inventive concepts.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
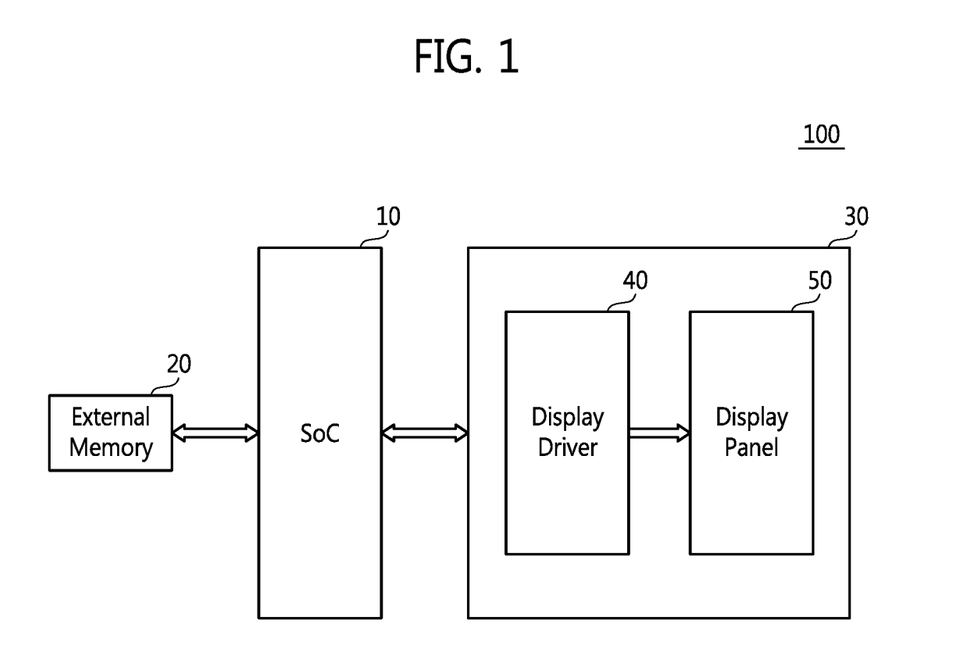
FIG. 1 is a block diagram of a display system according to exemplary embodiments of the inventive concept.

FIG. 1 is a block diagram of a display system 100 according to exemplary embodiments of the inventive concept. The display system 100 includes an external memory 20, a system on chip (SoC) 10, and a display device 30. Each of the elements 10, 20, 30 may be formed in a separate chip. The display system 100 may also include other elements, e.g., a camera interface. The display system 100 may be a handheld device, a handheld computer, or a mobile device such as a mobile phone, a smart phone, a tablet personal computer (PC), a personal digital assistant (PDA), a portable multimedia player (PMP), an MP3 player, or an automotive navigation system, which can display a still image data (or a still image) or a moving image data (or a moving image) on a display panel 50.

The external memory 20 stores program instructions executed in the SoC 10. The external memory 20 also stores image data used to display still images or a moving image on the display device 30. The moving image is a sequence of different still images presented in a short time. The external memory 20 may be a volatile or non-volatile memory. The volatile memory may be dynamic random access memory (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The SoC 10 controls the external memory 20 and/or the display device 30. The SoC 10 may be referred to as an integrated circuit (IC), a processor, an application processor, a multimedia processor, or an integrated multimedia processor.

The display device 30 includes a display driver 40 and the display panel 50. The SoC 10 and the display driver 40 may be integrated into a single module, a single SoC, or a single package, e.g., a multi-chip package. Alternatively, the display driver 40 and the display panel 50 may be integrated in to a single module.

The display driver 40 controls the operation of the display panel 50 according to signals output from the SoC 10. The display driver 40 may transmit, as an output image data, image data received from the SoC 10 to the display panel 50 through a selected interface.

The display panel 50 may display an image data output from the display driver 40. The display panel 50 may be implemented as a liquid crystal display (LCD), a light emitting diode (LED) display, an organic LED (OLED) display, or an active-matrix OLED (AMOLED) display.

Figure 2:
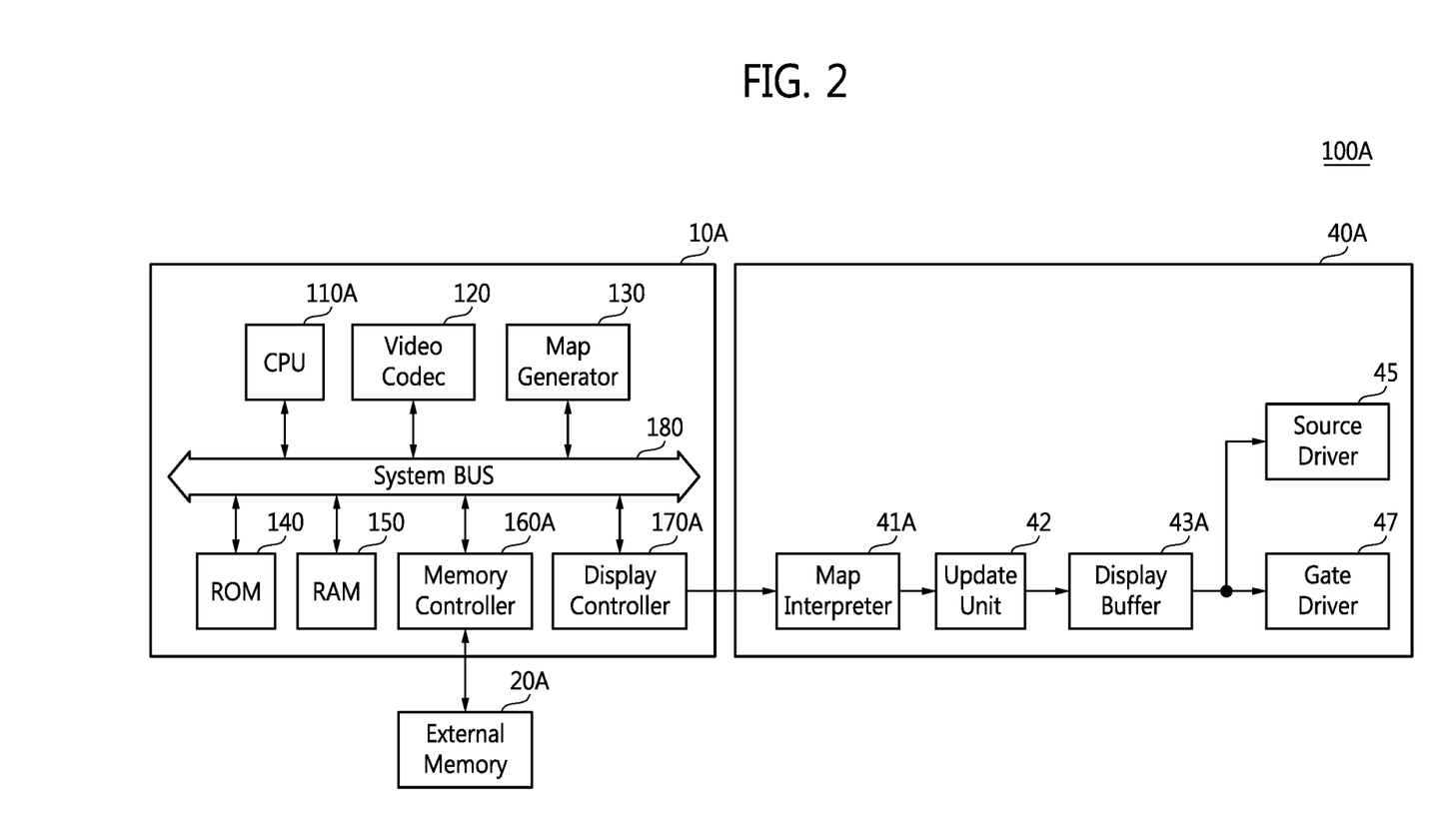
FIG. 2 is a detailed block diagram of a display system according to exemplary embodiments of the inventive concept.
Figure 3:
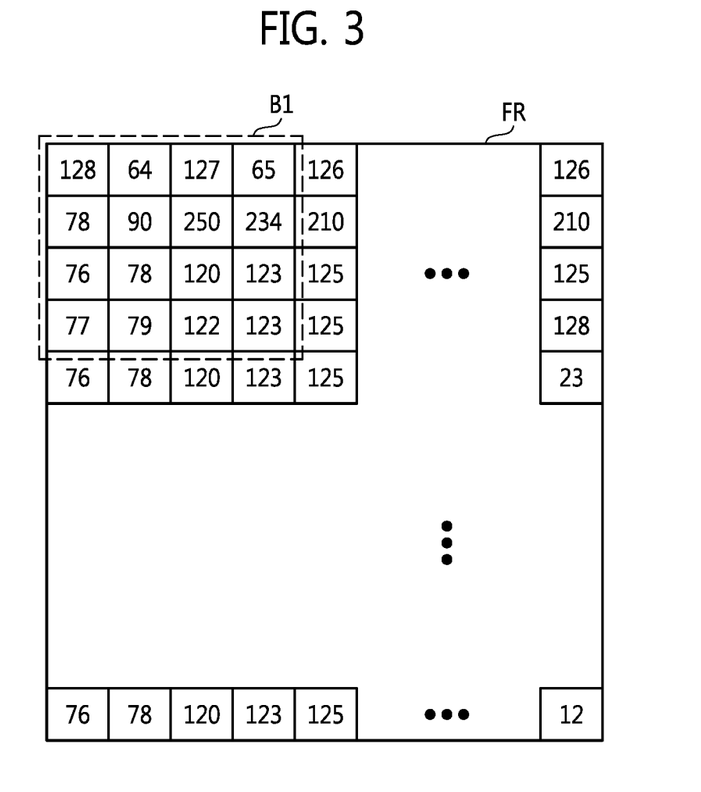
FIG. 3 is a diagram of data information output from a video codec illustrated in FIG. 2.
Figure 4:
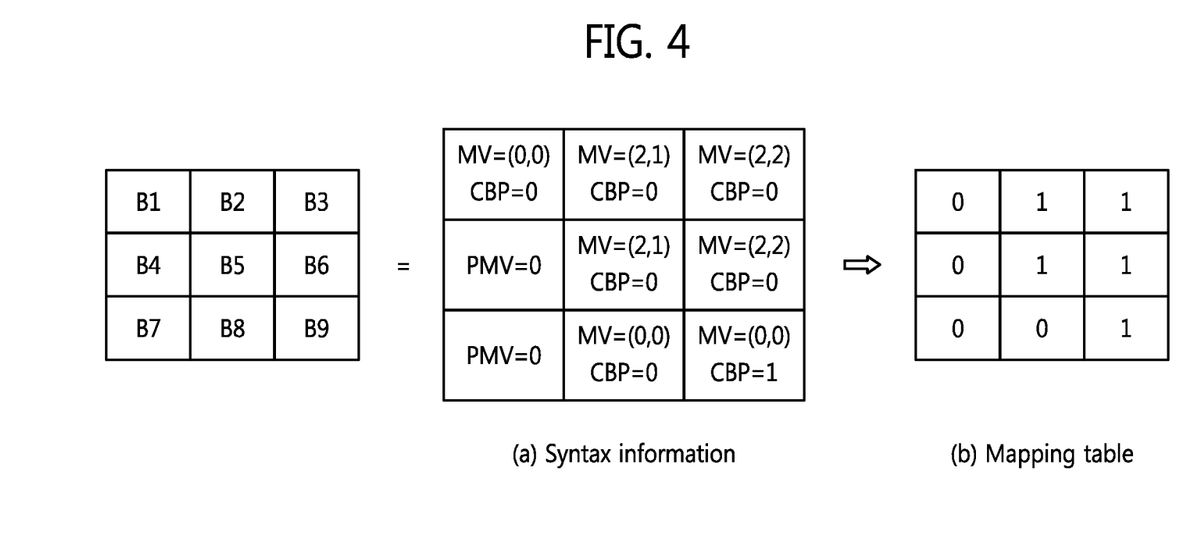
FIG. 4 is a diagram for explaining the operation of a map generator illustrated in FIG. 2.

FIG. 2 is a detailed block diagram of a display system 100A according to exemplary embodiments of the inventive concept. FIG. 3 is a diagram of data information output from a video codec 120 illustrated in FIG. 2. FIG. 4 is a diagram for explaining the operation of a map generator 130 illustrated in FIG. 2.

Referring to FIG. 2, a SoC 10A may include a central processing unit (CPU) 110A, the video codec 120, the map generator 130, a ROM 140, a RAM 150, a memory controller 160A, and a display controller 170A. The SoC 10A may also include a system bus 180 which functions as a passage for connecting other element of the SoC 10A and transferring data among the elements. The system bus 180 may include a small-scale bus for data communication between predetermined elements. The SoC 10A may also include elements other than those illustrated in FIG. 2.

The CPU 110A may control the overall operation of the SoC 10A. The CPU 110A may process or execute programs and/or data stored in the ROM 140 and/or the RAM 150. The CPU 110A may be implemented as a computing component including at least two independent processors (or cores), i.e., a multi-core processor.

The video codec 120 may encode or decode image data. The video codec 120 may output syntax information and data information based upon the result of encoding or decoding the image data. The syntax information and data information may be a portion of a bit stream of the encoded image data.

The syntax information is computed according to the result of encoding or decoding a previous frame and a current frame among a plurality of frames included in the image data block by block. The syntax information may include predictive mode information corresponding to each of a plurality of blocks, a motion vector corresponding to a predictive mode (predictive motion vector), and a coded block pattern.

The predictive mode information may include inter predictive mode having a skip mode and a non-skip mode and an intra predictive mode, which are defined during block-by-block encoding of a frame. In the exemplary embodiments of the inventive concept, whether or not to perform an update may be determined with respect to data of blocks corresponding to either of the skip and non-skip modes in the inter predictive mode while an update may always be performed with respect to data of blocks corresponding to the intra predictive mode. At this time, the skip mode may be expressed as a predictive motion vector, and the non-skip mode may be expressed as a motion vector and a coded block pattern.

A predictive motion vector may be a motion vector of a block adjacent to a current block in a current frame or a combination of motion vectors corresponding to blocks adjacent to the current block in the current frame. A motion vector may be a displacement calculated with respect to a current block in a current frame using motion estimation on a reference block in a previous frame. A coded block pattern may be a value calculated by transforming and quantizing a residual value corresponding to the difference between a pixel value of a reference block and a pixel value of a current block. The coded block pattern may be a bit mask that indicates which blocks coefficients are present for.

The data information may be information about pixel values corresponding to the respective blocks resulting from encoding or decoding. An example of the data information is illustrated in FIG. 3. A single frame FR may include a plurality of blocks and one block B1 among the plurality of blocks may include 4×4 pixels. In this case, each of 16 pixels may have a pixel value as a result of encoding or decoding performed on each pixel. In other words, the data information may be information representing a pixel value of each of the pixels included in each block according to the result of encoding or decoding a frame block by block.

The map generator 130 may determine whether a plurality of blocks in each frame are update blocks based upon syntax information output from the video codec 120, may set a bit flag corresponding to each of the blocks based upon the determination result and generate a mapping table, and may output the mapping table. The update block may be a block having a changed pixel value as compared to a previous frame. Data information corresponding to the update block may be information about a changed pixel value for a block to be updated.

The map generator 130 may generate a mapping table of blocks corresponding to the entire area of a current frame or a mapping table for blocks corresponding to a partial area of the current frame. Exemplary embodiments in which a mapping table is generated by the map generator 130 are illustrated in FIG. 4. Although a single frame includes nine blocks in the exemplary embodiments illustrated in FIG. 4, the inventive concept is not restricted to these exemplary embodiments. The nine blocks may correspond to the entire or partial area of a single frame.

Referring to FIG. 4, the map generator 130 may receive syntax information (a) from the video codec 120 for each block and may determine whether the block is an update block based upon the syntax information (a). The map generator 130 may set a bit flag corresponding to a block determined as the update block to a bit value of "1" and a bit flag corresponding to a block (hereinafter, referred to as a "non-update block") not determined as the update block to a bit value of "0", thereby generating a mapping table (b).

For instance, the map generator 130 may determine that blocks B1, B8 which correspond to the non-skip mode and have a value of "0" for both a motion vector MV and a coded block pattern CBP are non-update blocks and may set the bit flags corresponding to the blocks B1, B8 to "0". The map generator 130 may also determine that blocks B2, B3, B5, B6, B9 which correspond to the non-skip mode and having a non-zero value for either the motion vector MV or the coded block pattern CBP are update blocks and may set the bit flags corresponding to the blocks B2, B3, B5, B6, B9 to "1".

In other words, when the motion vector MV and the coded block pattern CBP of the current block have a value of "0", the map generator 130 may determine that the current block is a non-update block since the current block has the same position and pixel data as the reference block of the previous frame. However, when either of the motion vector MV and the coded block pattern CBP of the current block has a value other than "0", the map generator 130 may determine the current block is an update block since the current block has a position and pixel data different than the reference block of the previous frame.

In addition, the map generator 130 may determine whether a predictive motion vector PMV of a block has a value of "0" when the block corresponds to the skip mode. The map generator 130 may determine that the blocks B4, B7 having a predictive motion vector PMV of "0" are non-update blocks and may set the bit flags of the blocks B4, B7 to "0". In other words, when the predictive motion vector PMV of the current block has a value of "0", which means that motion vectors of blocks adjacent to the current block have a value of "0"; the map generator 130 may determine that the current block is a non-update block. However, the predictive motion vector PMV of the current block has a value other than "0", which means that motion vectors of blocks adjacent to the current block have a value other than "0"; the map generator 130 may determine that the current block is an update block.

Referring back to FIG. 2, the ROM 140 may store programs and/or data which are accessed by the CPU 110A and/or the video codec 120. The ROM 140 may be a nonvolatile memory such as Programmable ROM (PROM), Electrically Programmable ROM (EPROM), Electrically Erasable and Programmable ROM (EEPROM) such as flash memory, Phase-change Random Access Memory (PRAM), Magnetic RAM (MRAM), Resistive RAM (RRAM), and Ferroelectric RAM (FRAM), and the like. The RAM 150 may temporarily store programs, data, and/or instructions.

The RAM 150 may be a volatile memory or a nonvolatile memory such as Dynamic Random Access Memory (DRAM), Synchronous Random Access Memory (SRAM), Phase-change Random Access Memory (PRAM), Magnetic RAM (MRAM), Resistive RAM (RRAM), and Ferroelectric RAM (FRAM), and the like. The RAM 150 may temporarily store information about data which is input/output through an external memory 20A or generated by the video codec 120.

The memory controller 160A controls the overall operation of the external memory 20A and control data exchange between a host and the external memory 20A. For instance, the memory controller 160A may write data to or read data from the external memory 20A at the request of the host. At this time, the host may be a master device such as the CPU 110A or the display controller 170A.

The display controller 170A controls a display driver 40A to display image data encoded by the video codec 120 and/or image data decoded by the video codec 120 on the display panel 50. The display controller 170A may also output a mapping table generated by the map generator 130 to the display driver 40A. In addition, the display controller 170A may output data corresponding to update blocks among a plurality of blocks of image data encoded or decoded by the video codec 120 to the display driver 40A but may not output data corresponding to non-update blocks according to the determination result.

In other words, the display controller 170A may output a mapping table and data corresponding to update blocks to the display driver 40A, so that only data corresponding to blocks to be updated is transmitted to the display driver 40A. As a result, the bandwidth between the SoC 10A and the display driver 40A is reduced and the power consumption of the display system 100A is also reduced.

The display driver 40A may include a map interpreter 41A, an update unit 42, a display buffer 43A, a source driver 45, and a gate driver 47. The map interpreter 41A may detect a block corresponding to an update block and a block corresponding to a non-update block among the plurality of blocks based upon the mapping table and may output the detection result to the update unit 42. Although the map interpreter 41A is included in the display driver 40A in the exemplary embodiments illustrated in FIG. 2, the map interpreter 41A may be formed between the SoC 10A and the display driver 40A to be separated from the display driver 40A in other exemplary embodiments.

The update unit 42 may output block information and data information corresponding to the update block based upon the detection result output from the map interpreter 41A. The display buffer 43A may update data information corresponding to the update block among data information that has been stored for each of the blocks in a frame and keep data information corresponding to the non-update block based upon the block information and may output an updated frame.

The source driver 45 may drive a plurality of data lines (or source lines) formed in the display panel 50 in response to information about the updated frame output from the display buffer 43A. The gate driver 47 may sequentially drive a plurality of gate lines (or scan lines) formed in the display panel 50 in response to information about the updated frame output from the display buffer 43A.

Although according to exemplary embodiments of the present inventive concepts, the syntax information includes predictive mode information corresponding to each of a plurality of blocks, a motion vector corresponding to a predictive mode (predictive motion vector), and a coded block pattern, the syntax information is not limited thereto. The syntax information for determining an update block may vary based upon an compression algorithm or processing architecture of a display system.

Figure 5:
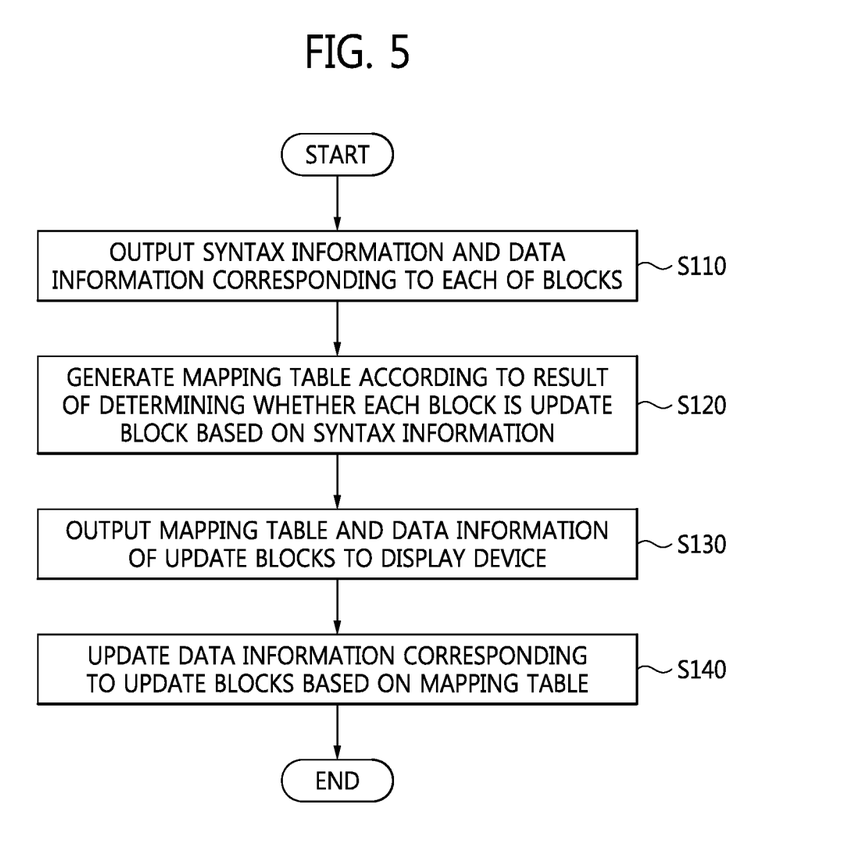
FIG. 5 is a flowchart of a method of operating a display system according to exemplary embodiments of the inventive concept.
Figure 6:
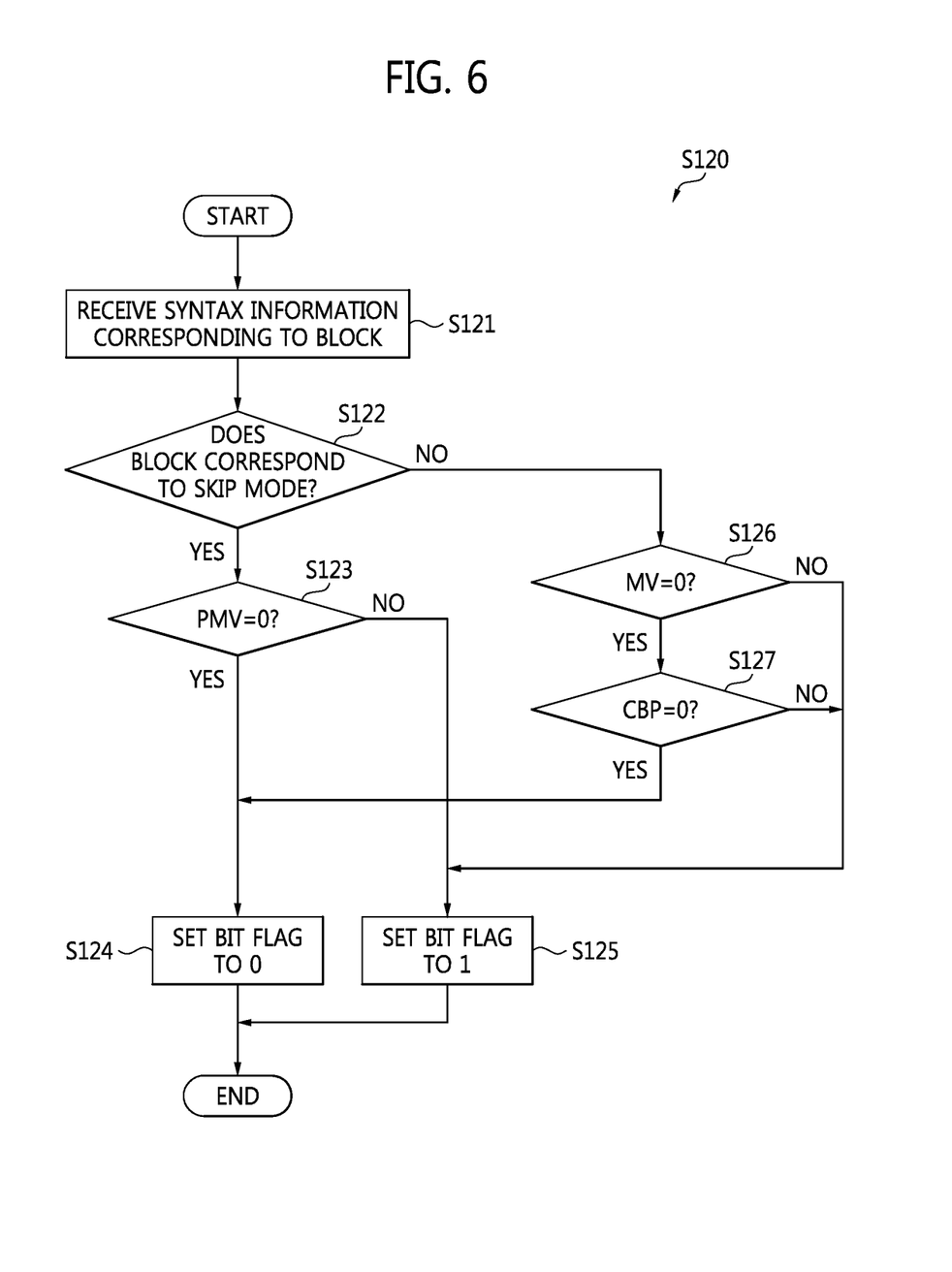
FIG. 6 is a detailed flowchart of the operation of a map generator in the method illustrated in FIG. 5.
Figure 7:
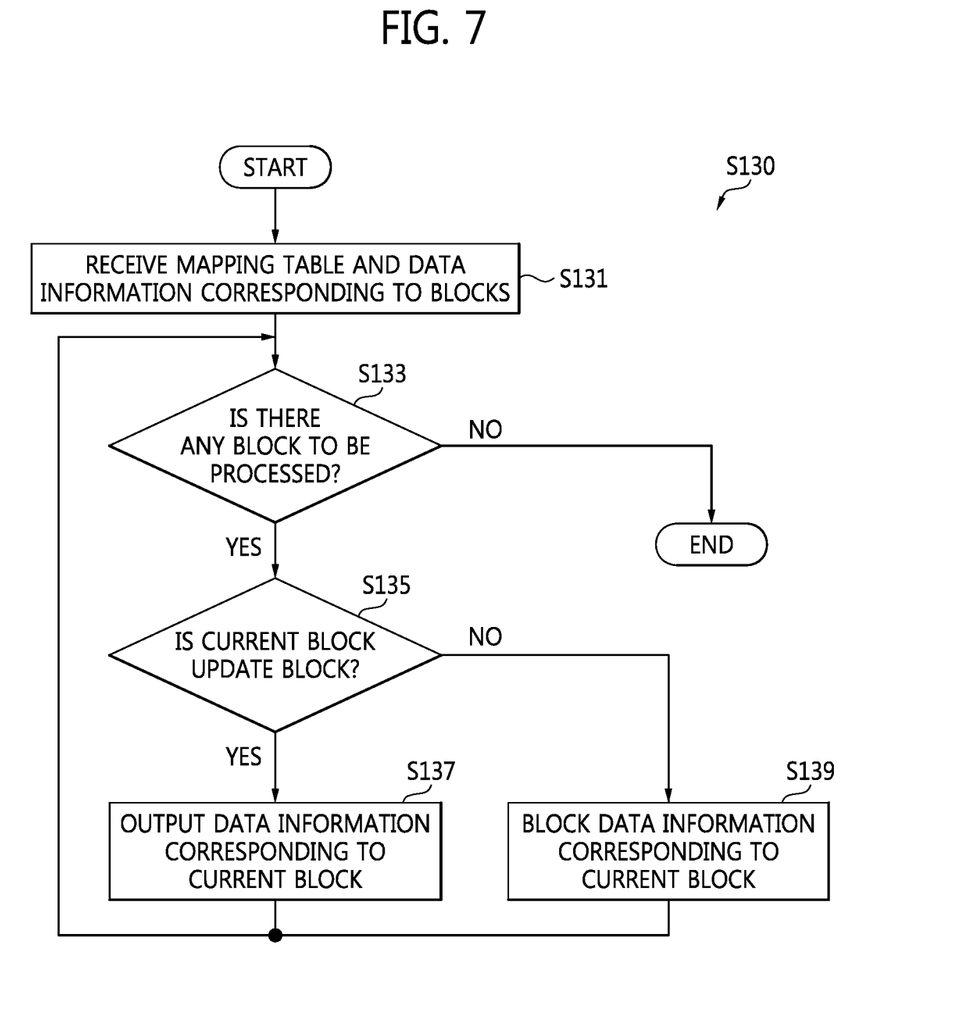
FIG. 7 is a detailed flowchart of the operation of a display controller in the method illustrated in FIG. 5.

FIG. 5 is a flowchart of a method of operating a display system according to exemplary embodiments of the inventive concept. FIG. 6 is a detailed flowchart of the operation of a map generator in the method illustrated in FIG. 5. FIG. 7 is a detailed flowchart of the operation of a display controller in the method illustrated in FIG. 5.

Referring to FIGS. 1 through 7, the video codec 120 may output syntax information and data information, which may correspond to each of a plurality of blocks included in each frame, based upon the result of encoding or decoding image data in operation S110. The map generator 130 may generate a mapping table according to the result of determining whether each of the blocks is an update block based upon the syntax information in operation S120. The map generator 130 may generate the mapping table by setting a bit flag corresponding to each of the blocks based upon the determination result. Operation S120 may include operations S121 through S127 which will be described based upon one of the blocks included in each frame with reference to FIG. 6.

The map generator 130 may receive the syntax information corresponding to a current block from the video codec 120 in operation S121 and may determine whether the current block corresponds to the skip mode based upon predictive mode information included in the syntax information in operation S122. When the current block is determined to correspond to the skip mode, the map generator 130 may determine whether the predictive motion vector PMV of the current block is 0 in operation S123.

When the predictive motion vector PMV of the current block is 0, the map generator 130 may set the bit flag of the current block to 0 in operation S124. When the predictive motion vector PMV of the current block is not 0, the map generator 130 may set the bit flag of the current block to 1 in operation S125.

When it is determined that the current block does not correspond to the skip mode in operation S122, the map generator 130 may determine whether the motion vector MV of the current block is 0 in operation S126. When the motion vector MV of the current block is 0, the map generator 130 may determine whether the coded block pattern CBP is 0 in operation S127. When both the motion vector MV and the coded block pattern CBP are 0, the map generator 130 may set the bit flag of the current block to 0 in operation S124.

However, when the motion vector MV of the current block is not 0 in operation S126 or when the coded block pattern CBP of the current block is not 0 in operation S127, the map generator 130 may set the bit flag of the current block to 1 in operation S125.

In other words, the map generator 130 may set the bit flag of the current block to 1 when the current block corresponds to an update block and the bit flag of the current block to 0 when the current block corresponds to a non-update block based upon the result of determining the syntax information of the current block, thereby generating the mapping table.

The display controller 170A may output the mapping table and the data information corresponding to the update block to the display device 30 in operation S130. The operation of the display controller 170A is illustrated in FIG. 7.

Referring to FIG. 7, the display controller 170A may receive the mapping table and the data information corresponding to the plurality of blocks in operation S131 and may determine whether there is any block to be processed among the plurality of blocks in operation S133. When there is any block to be processed, the display controller 170A may determine whether a current block is an update block based upon the mapping table in operation S135.

When the current block is the update block, the display controller 170A may output the data information corresponding to the current block in operation S137. When the current block is not the update block, the display controller 170A may block the data information corresponding to the current block from being output in operation S139. In other words, the display controller 170A may not update the current block. When there is no block to be processed in operation S133, the display controller 170A may determine that the processing of the blocks is completed.

In other words, the display controller 170A may determine whether each of blocks included in a frame is an update block. For instance, the display controller 170A may determine that the blocks B2, B3, B5, B6, B9 shown in FIG. 4 are update blocks based upon the mapping table and may output only the data information corresponding to those blocks B2, B3, B5, B6, B9 to the display device 30. Consequently, the display controller 170A may output the mapping table and the data information corresponding to the blocks determined as update blocks to the display device 30.

The display device 30 may update the data information corresponding to the update blocks among the plurality of block based upon the mapping table in operation S140. In more detail, the display driver 40A included in the display device 30 may update the data information corresponding to the update blocks among the data information that has been stored in the display buffer 43A and maintain the data information corresponding to non-update blocks among the data information and may output an updated frame.

Figure 8A:
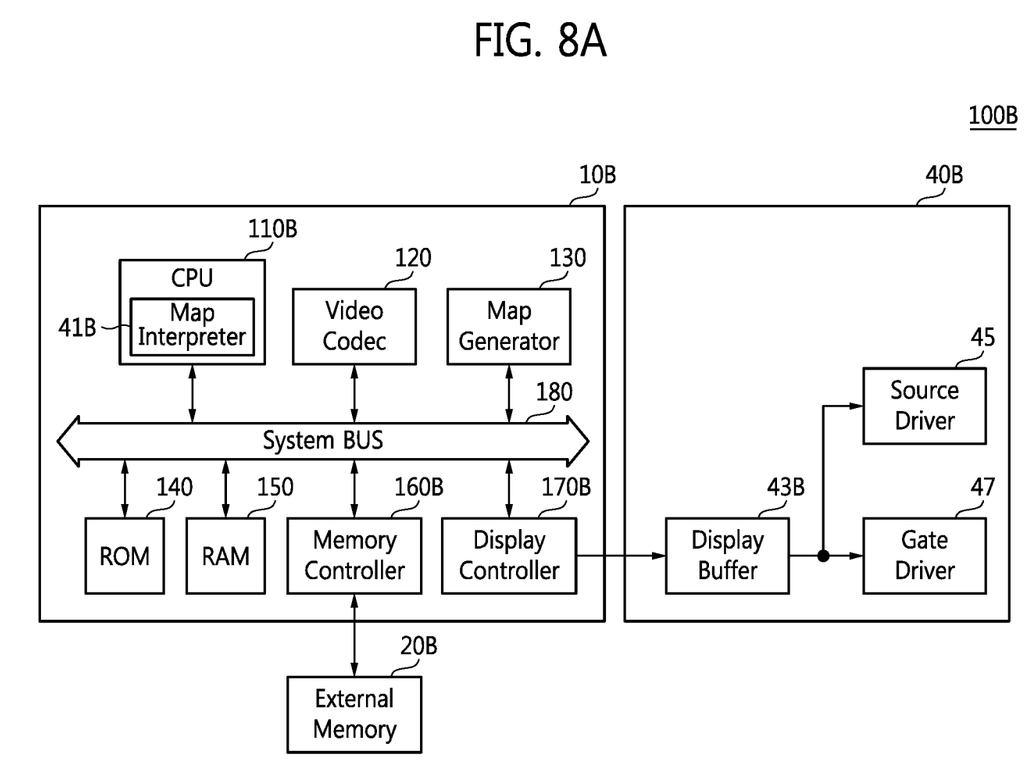
FIGS. 8A and 8B are detailed block diagrams of display systems according to other exemplary embodiments of the inventive concept.
Figure 8B:
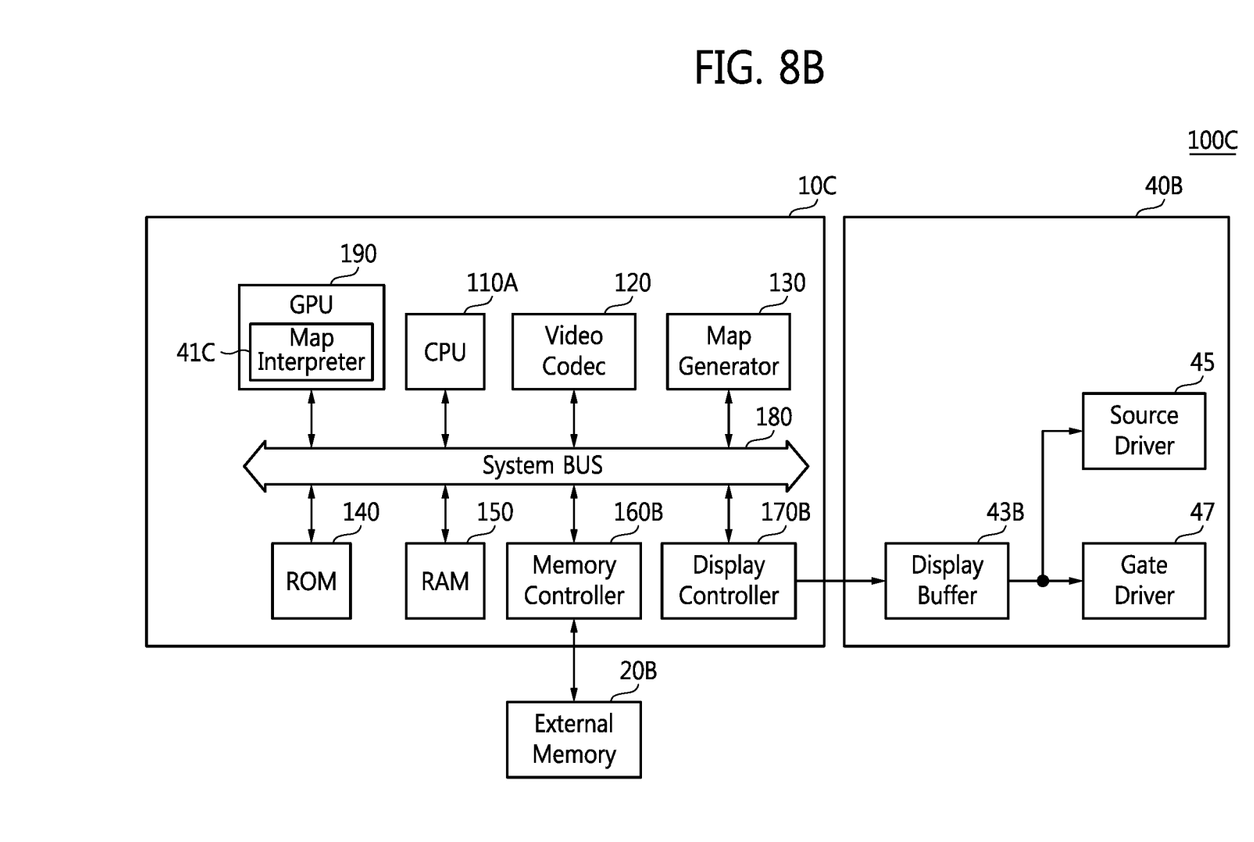

FIGS. 8A and 8B are detailed block diagrams of display systems 100B, 100C according to other exemplary embodiments of the inventive concept. The structure and functions of the display systems 100B, 100C illustrated in FIGS. 8A and 8B are similar to those of the display system 100A illustrated in FIG. 2, and therefore, only the differences from the display system 100A will be described to avoid redundancy.

Referring to FIG. 8A, a map interpreter 41B may be programmed in software to a CPU 110B. The map interpreter 41B may detect block information corresponding to an update block among a plurality of blocks based upon a mapping table generated by the map generator 130 and may output the block information and data information corresponding to the update block.

Referring to FIG. 8B, a SoC 10C may also include a graphics processing unit (GPU) 190 which converts data read by a memory controller 160B from an external memory 20B into a signal suitable to a display device 40B. A map interpreter 41C may be embedded in the GPU 190. The map interpreter 41C may detect block information corresponding to an update block among a plurality of blocks based upon a mapping table and may output the block information and data information corresponding to the update block.

The CPU 110B illustrated in FIG. 8A or the GPU 190 illustrated in FIG. 8B may output the data information corresponding to the update block to the external memory 20B through a memory controller 160B. The external memory 20B may update and store the data information corresponding to the update block among the data information that has been stored for each of the blocks in each frame and may output the data information of the updated frame to the memory controller 160B. A display controller 170B may receive the updated frame from the memory controller 160B and output it to a display driver 40B.

Unlike the display driver 40A illustrated in FIG. 2, the display driver 40B may include only a display buffer 43B, the source driver 45, and the gate driver 47. The display buffer 43B may output information about the updated frame to the source driver 45 and the gate driver 47.

Consequently, data only corresponding to blocks to be updated is transmitted to the external memory 20B, so that the bandwidth between each SoC 10B or 10C and the external memory 20B is reduced and power consumption of each display system 100B or 100C is also reduced.

Figure 9:
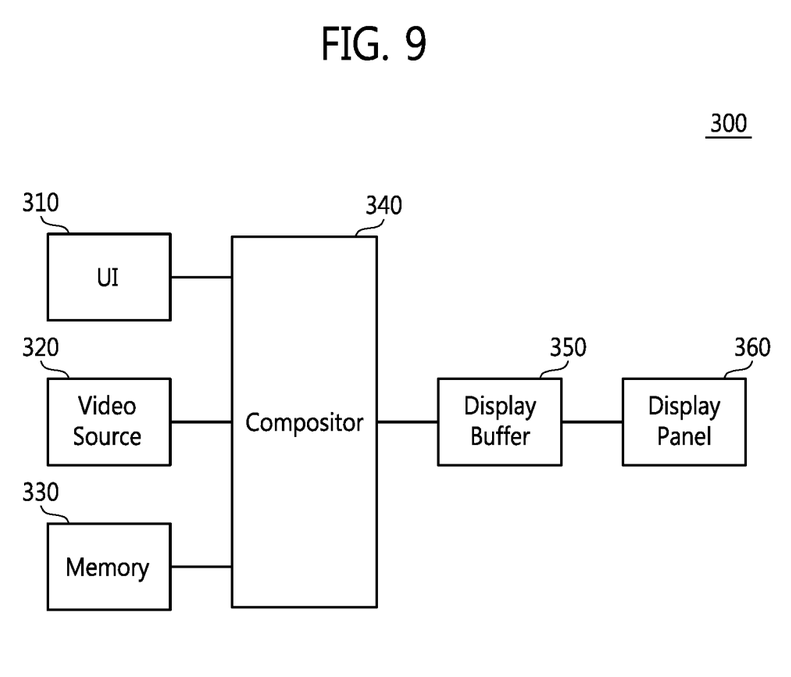
FIG. 9 is a block diagram of a mobile device according to exemplary embodiments of the inventive concept.

FIG. 9 is a block diagram of a mobile device 300 according to exemplary embodiments of the inventive concept. Referring to FIG. 9, the mobile device 300 may include a user interface (UI) 310, a video source 320, a memory 330, a compositor 340, a display buffer 350, and a display panel 360. The UI 310 is a unit for inputting data to be processed by the compositor 340 and may be implemented as a touch pad.

The video source 320 is a video capture device such as a video camera or a video content supply device. The video source 320 may include the video codec 120 and the map generator 130 illustrated in FIG. 2. In other words, the video source 320 may output a mapping table generated based upon syntax information corresponding to each of a plurality of blocks included in each frame of image data and data information corresponding to update blocks. The memory 330 may store programs or data and may be formed of volatile or non-volatile memory.

The compositor 340 may combine and process all data information involved in image processing and may display the processed result on the display panel 360. For instance, the compositor 340 may combine and process data information corresponding to at least one touch signal generated by the UI 310 and data information output from the video source 320.

The compositor 340 may include the map interpreter 41A illustrated in FIG. 2. In other words, the compositor 340 may output data information corresponding to an update block based upon a mapping table output from the video source 320. The operation of the compositor 340 may be performed by a GPU (not shown).

The display buffer 350 may update data information corresponding to the update block among the data information that has been stored therein and may output the updated data information. The display panel 360 may display image data or video data that has been output from the UI 310 and the video source 320 and then processed by the compositor 340.

As described above, in a SoC, a display system including the same, and a method of operating the display system according to exemplary embodiments of the inventive concept, the SoC transmits data only corresponding to an update area using video syntax information without using a separate method of extracting the update area, thereby reducing bandwidth and power consumption.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A system on chip comprising:
a video codec configured to output syntax information and data information, which correspond to each of a plurality of blocks comprised in each frame of image data, based upon a result of encoding or decoding the image data;
a map generator configured to determine whether each of the blocks is an update block based upon the syntax information and to generate a mapping table based upon a determination result; and
a display controller configured to output the mapping table and data information corresponding to the update block to a display device,
wherein the syntax information comprises predictive mode information corresponding to each of the blocks and a motion vector and a coded block pattern, which correspond to a predictive mode corresponding to the predictive mode information,
wherein the data information refers to a pixel value of each of the blocks based upon the encoding or decoding result and the data information corresponding to the update block refers to a changed pixel value of a block to be updated among the plurality of blocks,
wherein the map generator sets a bit flag corresponding to each of the blocks based upon a determination result and generates the mapping table, wherein the bit flag indicates whether a current block is an update block or a non-update block, and
wherein the display controller outputs the data information corresponding to the update block to the display device and blocks data information corresponding to the non-update block from being output to the display device.

2. The system on chip of claim 1, wherein when a first block among the plurality of blocks corresponds to a skip mode, the map generator sets the bit flag corresponding to the first block to a first bit value when a predictive motion vector of the first block is not 0 and sets the bit flag to a second bit value when the predictive motion vector is 0.

3. The system on chip of claim 2, wherein when a second block among the plurality of blocks corresponds to a non-skip mode, the map generator sets the bit flag corresponding to the second block to the first bit value when either of the motion vector and the coded block pattern of the second block is not 0.

4. The system on chip of claim 3, wherein when a third block among the plurality of blocks corresponds to the non-skip mode, the map generator sets the bit flag corresponding to the third block to the second bit value when both of the motion vector and the coded block pattern of the third block are 0.

5. The system on chip of claim 4, wherein each block having the first bit value as the bit flag is the update block.

6. The system on chip of claim 1, wherein the plurality of blocks corresponds to an entire area of each frame or a partial area of each frame.

7. A display system comprising:
a system on chip configured to determine whether each of a plurality of blocks comprised in each frame of image data is an update block based upon syntax information corresponding to each of the blocks, to generate a mapping table based upon a determination result, and to output data information corresponding to the update block based upon the mapping table; an external memory configured to receive the data information corresponding to the update block, to update and store a block corresponding to the received data information among data information that has been stored for each of the blocks, and to output data information of an updated frame; and a display device configured to display the updated frame based upon the data information output from the external memory,
wherein the system on chip comprises: a video codec configured to output the syntax information and data information, which correspond to each of the blocks, based upon the determination result of encoding or decoding the image data; and a map generator configured to set a bit flag corresponding to each block according to a result of determining whether the block is an update block based upon the syntax information to generate the mapping table and to output the mapping table,
wherein the syntax information comprises predictive mode information corresponding to each of the blocks and a motion vector and a coded block pattern which correspond to a predictive mode corresponding to the predictive mode information, and
wherein the system on chip transmits the data information corresponding to the update block to the display device and does not transmit data information corresponding to a non-update block to the display device.

8. The display system of claim 7, wherein the system on chip further comprises a central processing unit (CPU) configured to control overall operation of the system on chip, and wherein the CPU detects a block information corresponding to the update block among the plurality of blocks based upon the mapping table and outputs the block information and the data information corresponding to the update block.

9. The display system of claim 7, wherein the system on chip further comprises a graphics processing unit (GPU) configured to convert data read from the external memory into a signal suitable to the display device, and wherein the GPU detects block information corresponding to the update block among the plurality of blocks based upon the mapping table and outputs the block information and the data information corresponding to the update block.

10. A method of operating a display system, the method comprising:
generating syntax information and data information, which correspond to each of a plurality of blocks comprised in each frame of image data, based upon a result of encoding or decoding the image data;
determining whether each of the blocks is an update block based upon the syntax information;
generating a mapping table based upon a determination result; outputting the mapping table and data information corresponding to the update block to a display device; and
updating data information of a block corresponding to the update block among the plurality of blocks based upon the mapping table,
wherein the generating the mapping table comprises setting a bit flag corresponding to each of the blocks based upon the result of determining whether each block is the update block,
wherein the setting the bit flag comprises: when a first block among the plurality of blocks corresponds to a skip mode, setting the bit flag corresponding to the first block to a first bit value when a predictive motion vector of the first block is not 0 and setting the bit flag to a second bit value when the predictive motion vector is 0; and when the first block corresponds to a non-skip mode, setting the bit flag corresponding to the first block to the first bit value when either of the predictive motion vector and a coded block pattern of the first block is not 0 and setting the bit flag corresponding to the first block to the second bit value when both of the predictive motion vector and the coded block pattern of the first block are 0.

11. The method of claim 10, wherein the updating the data information comprises: detecting block information corresponding to the update block among the plurality of blocks based upon the mapping table; outputting the block information and the data information corresponding to the update block; and updating data information corresponding to the update block among data information that has been stored in advance for the blocks based upon the block information and outputting an updated frame.

* * * * *